United States Patent
Lilly et al.

(10) Patent No.: US 9,599,711 B2
(45) Date of Patent: Mar. 21, 2017

(54) ACTIVE BLADE TRACKER AND RELATED SYSTEMS AND METHODS

(71) Applicant: HONEYWELL INTERNATIONAL INC., Morristown, NJ (US)

(72) Inventors: David Daniel Lilly, Ramona, CA (US); Chris Kuo, San Diego, CA (US); Douglas Lacy, San Diego, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 308 days.

(21) Appl. No.: 14/331,956

(22) Filed: Jul. 15, 2014

(65) Prior Publication Data

US 2016/0018521 A1   Jan. 21, 2016

(51) Int. Cl.

| G01C 3/08 | (2006.01) |
|---|---|
| G01S 17/08 | (2006.01) |
| G01S 17/46 | (2006.01) |
| G01S 17/88 | (2006.01) |
| G01B 11/02 | (2006.01) |
| B64C 27/00 | (2006.01) |
| G01S 17/50 | (2006.01) |
| G01S 17/87 | (2006.01) |

(52) U.S. Cl.
CPC ............ *G01S 17/08* (2013.01); *B64C 27/008* (2013.01); *G01B 11/026* (2013.01); *G01S 17/46* (2013.01); *G01S 17/50* (2013.01); *G01S 17/87* (2013.01); *G01S 17/88* (2013.01)

(58) Field of Classification Search
CPC .......... G01S 17/87; G01S 17/88; G01S 17/46; G01S 17/08; G01B 11/026; B64C 27/008

USPC ........................................................ 356/4.01
See application file for complete search history.

(56) References Cited

U.S. PATENT DOCUMENTS

| 2,552,739 | A |   | 5/1951 | Roberts |
|---|---|---|---|---|
| 2,960,908 | A |   | 11/1960 | Willits et al. |
| 2,964,849 | A |   | 12/1960 | Roccati |
| 3,002,420 | A |   | 10/1961 | Willits et al. |
| 3,012,468 | A | * | 12/1961 | Magill .................. B64C 27/008 356/138 |
| 3,023,317 | A |   | 2/1962 | Willits et al. |
| 3,386,031 | A |   | 5/1968 | Able et al. |
| 3,524,354 | A |   | 8/1970 | Frank et al. |
| 4,049,349 | A |   | 9/1977 | Wennerstrom |
| 4,053,123 | A |   | 10/1977 | Chadwick |

(Continued)

FOREIGN PATENT DOCUMENTS

| CN | 102944361 A1 | 2/2013 |
|---|---|---|
| WO | 8906623 A1 | 7/1989 |

OTHER PUBLICATIONS

Extended EP Search Report for Application No. 15175555.0-1812 dated Nov. 30, 2015.

(Continued)

*Primary Examiner* — Mark Hellner
(74) *Attorney, Agent, or Firm* — Lorenz & Kopf, LLP

(57) ABSTRACT

Devices, methods and systems are provided for monitoring movement of an object, such as rotation of a blade or other airfoil. One exemplary tracking device includes a first emitter to emit first radiation along a first line of sight, a first detector proximate the first emitter to detect the first radiation, a second emitter to emit second radiation along a second line of sight, and a second detector proximate the second emitter to detect the second radiation.

20 Claims, 2 Drawing Sheets

(56) References Cited

U.S. PATENT DOCUMENTS

| | | | |
|---|---|---|---|
| 4,465,367 | A | 8/1984 | Sabatier |
| 4,531,408 | A | 7/1985 | Chadwick et al. |
| 4,812,643 | A | 3/1989 | Talbot |
| 5,546,188 | A | 8/1996 | Wangler et al. |
| 5,671,051 | A | 9/1997 | Wright, Jr. |
| 5,929,431 | A * | 7/1999 | Hadley ................. B64C 27/008 250/206.1 |
| 6,448,924 | B1 | 9/2002 | Hafer, Jr. |
| 6,833,909 | B2 * | 12/2004 | Schmidt ................... G01C 3/08 250/201.6 |
| 2011/0285578 | A1 | 11/2011 | Peczalski et al. |

OTHER PUBLICATIONS

Castelline, P. et al.; Vibration Measurements on Blades of a Naval Propeller Rotating in Water with Tracking Laser Vibrometer; Measurement 24 (1998) 43-54.

* cited by examiner

ACTIVE BLADE TRACKER AND RELATED SYSTEMS AND METHODS

TECHNICAL FIELD

The subject matter described herein relates generally to avionics systems, and more particularly, embodiments of the subject matter relate to detecting rotating blades of a helicopter or other rotorcraft.

BACKGROUND

Rotating blades in a blade assembly may experience bending, twisting, and aerodynamic forces that can lead to a blade moving out-of-plane with respect to the other blades. Such deviations with respect to the horizontal plane of rotation or other imbalances can undesirably produce vibrations or increase wear on components of the blade assembly, other avionics and airframe components, as well as contribute to crew fatigue.

Many existing approaches used to detect the track height of the blades involve the use of photodiodes or other passive optics to detect changes in the ambient light as the blades traverse the field of view of the optics. However, depending on characteristics of the blades (e.g., the color and/or condition of the paint, the type of material, the angle of attack, and the like) and the current environmental conditions (e.g., weather, ambient lighting for the particular time of day, etc.), such approaches may fail to adequately detect the blades, which, in turn, may result in the craft being grounded (e.g., after major maintenance) until the problem can be resolved and the track height can be obtained. Other approaches are more manually intensive, and typically involve applying reflective material to the undersides or tips of the blades for purposes of detecting the track height and removing the reflective material thereafter, and also are largely dependent upon the experience of the operator in order to collect reliable data. These approaches are more time consuming and may still fail for various reasons (e.g., the reflectivity of the material, the angle of attack, the current environmental conditions, and the like). Thus, what is needed is a means for blade track height detection that is reliable across a wide range of environmental conditions and blade characteristics.

BRIEF SUMMARY

Devices and methods are provided for monitoring movement of an object, such as rotational movement of a blade or other airfoil. One exemplary tracking device includes a first emitter to emit first radiation along a first line of sight towards a reference plane of motion for an object, a first detector proximate the first emitter to detect at least a portion of the first radiation reflected from the reference plane, a second emitter to emit second radiation along a second line of sight towards the reference plane, and a second detector proximate the second emitter to detect at least a portion of the second radiation reflected from the reference plane.

In one embodiment, a blade tracking device includes a first emitter-detector arrangement to emit first radiation along a first line of sight and detect at least a portion of the first radiation in response to a blade traversing the first line of sight, a second emitter-detector arrangement to emit second radiation along a second line of sight and detect at least a portion of the second radiation in response to the blade traversing the second line of sight, wherein the second line of sight is different from the first line of sight, and a processing system coupled to the first emitter-detector arrangement and the second emitter-detector arrangement. The processing system generates a first output signal at an interface of the blade tracking device in response to the first emitter-detector arrangement detecting the first radiation and generates a second output signal at the interface in response to the second emitter-detector arrangement detecting the second radiation.

In yet another embodiment, an exemplary method of monitoring rotation of a blade involves emitting first radiation along a first line of sight towards a reference plane of rotation for the blade, generating a first output indication in response to detecting at least a portion of the first radiation reflected along the first line of sight by the blade, generating second radiation along a second line of sight towards the reference plane of rotation for the blade, and generating a second output indication in response to detecting at least a portion of the second radiation reflected along the second line of sight by the blade.

BRIEF DESCRIPTION OF THE DRAWINGS

Embodiments of the subject matter will hereinafter be described in conjunction with the following drawing figures, which are not necessarily drawn to scale, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to an active tracking device that is capable of reliably detecting moving objects, such as helicopter blades, across a wide range of environmental conditions and blade characteristics. As described in greater detail below, an active blade tracking device includes a plurality of sources of electromagnetic radiation (alternatively referred to herein as emitters) configured to emit the respective electromagnetic radiation towards a reference plane of rotation for the blades along different lines of sight. The emitters are paired or otherwise associated with corresponding detectors located proximate to the emitters to sense, measure, or otherwise detect electromagnetic radiation that was emitted by its paired emitter and reflected back towards the tracking device substantially along the same line of sight as the electromagnetic radiation. Each detector may be collocated with, disposed adjacent to, or otherwise aligned with the line of sight for the radiation emitted by its paired emitter and tuned to detect the radiation emitted by its paired emitter. In this regard, in some embodiments, each emitter may be tuned or otherwise adjusted to emit electromagnetic radiation with one or more different signal characteristic(s) than the other emitter(s) to minimize any potential interference and improve the reliability of the tracking device by reducing the likelihood of false positives (e.g., by tuning each of the detectors for a unique combination of signal characteristics).

Figure 1:
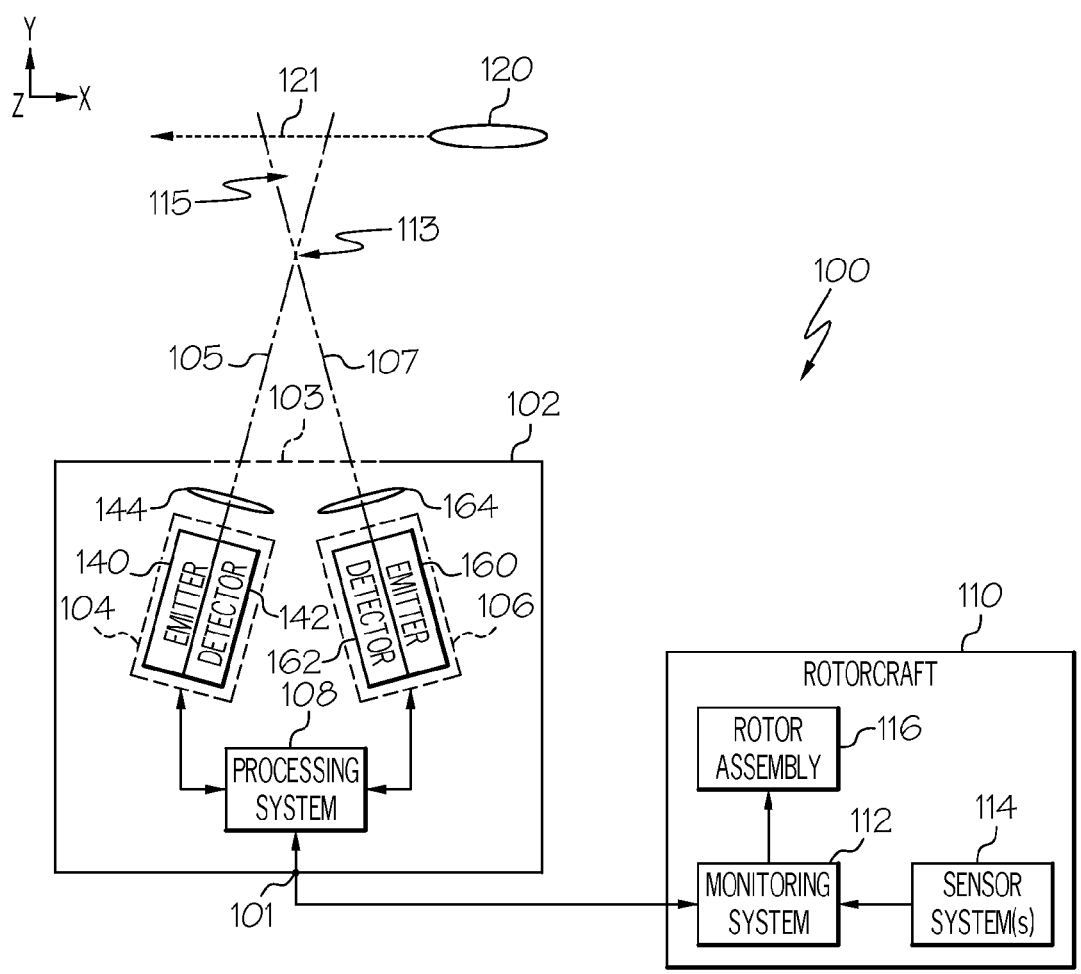
FIG. 1 is a block diagram of a tracking system suitable for use with a rotorcraft in accordance with one embodiment.

FIG. 1 depicts an exemplary embodiment of a tracking system 100 for monitoring movement of an object 120, such as a blade, wing or other airfoil of a rotorcraft 110, such as a helicopter 110. For purposes of explanation, the subject matter may be described herein in the context of the tracking system 100 monitoring the track height for a blade 120 of a helicopter 110 as it rotates in a horizontal plane (e.g., the xz-reference plane), however, it will be appreciated that the subject matter described herein is not intended to be limited to any particular type of airfoil, rotorcraft, and/or plane of rotation. Moreover, while the subject matter may be described in the context of a single blade 120 for purposes of explanation, in practice, the rotorcraft 110 will include a plurality of blades that rotate in conjunction with a rotor assembly 116 including the blade 120, with the tracking system 100 monitoring the track height for all of the blades associated with the rotor assembly 116. In this regard. FIG. 1 depicts a simplified representation of a tracking system 100 for purposes of explanation, and FIG. 1 is not intended to limit the subject matter in any way.

In exemplary embodiments, the tracking system 100 includes a tracking device 102 (or tracker) that generates or otherwise provides a signal or other indication at an input/output (I/O) interface 111 that corresponds to the blade 120 traversing a field of view 115 associated with the tracking device 102. The tracker interface 111 is coupled to a monitoring system 112 associated with the helicopter 110. As described in greater detail below, the monitoring system 112 utilizes the signals from the tracker interface 111 that are indicative of the relative timing for when the blade 120 entered and exited the tracker field of view 115 to calculate or otherwise determine a height of the blade 120 relative to the horizontal plane of rotation for the blades 120 associated with the rotor assembly 116 (e.g., a deviation in the y-reference direction relative to the xz-reference plane of rotation). Based on the track height associated with the blade 120 and other measurement data and/or information associated with the rotorcraft 110 obtained from one or more onboard sensor systems 114, the monitoring system 112 cooperates with the rotor assembly 116 to adjust one of more characteristics of the blade 120 and/or another blade associated with the rotor assembly 116 to achieve a desired operation of the rotorcraft 110. In this regard, the monitoring system 112 may signal the rotor assembly 116 to adjust the track height of one or more of the blades 120 to reduce track height imbalances based on the blade track heights calculated based on the output signals generated by the tracking device 102.

As illustrated in FIG. 1, tracking device 102 includes a first emitter-detector arrangement 104 (or emitter-detector pair), a second emitter-detector arrangement 106, and a processing system 108 coupled to the emitter-detector arrangements 104, 106. The first emitter-detector arrangement 104 is configured to detect or otherwise identify when the blade 120 traverses a first line of sight 105 associated with the first emitter-detector arrangement 104, and similarly, the second emitter-detector arrangement 106 is configured to detect or otherwise identify when the blade 120 traverses its associated line of sight 107. In exemplary embodiments, the lines of sight 105, 107 are angled with respect to one another such that they intersect at a point 113 outside of the tracking device 102 to define a substantially conical field of view 115 for the tracking device 102. In exemplary embodiments, the emitter-detector arrangements 104, 106 and the processing system 108 are housed within a common housing 101 or body having one or more interfaces 111 (e.g., ports, terminals, or the like) for coupling to the monitoring system 112, along with one or more aperture portions 103. The aperture portion 103 is substantially transparent and aligned with the lines of sight 105, 107 of the emitter-detector arrangements 104, 106 to enable or otherwise accommodate the lines of sight 105, 107 extending beyond the housing 101 of the tracking device 102. Additionally, although not illustrated in FIG. 1, in practice, the housing 101 of the tracking device 102 may include one or more external physical features configured to accommodate mounting or otherwise mechanically coupling the tracking device 102 to the exterior of the rotorcraft 110.

The first emitter-detector arrangement 104 includes one or more sources 140 configured to emit electromagnetic radiation along the line of sight 105. For purposes of explanation, the source(s) 140 of electromagnetic radiation may alternatively be referred to herein as an emitter. The first emitter-detector arrangement 104 also includes one or more elements 142 configured to sense, measure, or otherwise detect electromagnetic radiation along the line of sight 105. For purposes of explanation, the element(s) 142 of the emitter-detector arrangement 104 that are sensitive to or otherwise detect the electromagnetic radiation may alternatively be referred to herein as a detector. As described in greater detail below in the context of FIG. 2, in one or more embodiments, the detector 142 may be tuned, adjusted, or otherwise configured to selectively detect electromagnetic radiation having one or more signal characteristics that match or otherwise correspond to one or more known signal characteristics of the electromagnetic radiation emitted by emitter 140, such that the detector 142 rejects or otherwise ignores other forms of electromagnetic radiation. For example, in some embodiments, the detector 142 may be configured to detect electromagnetic radiation having one or more specific values for one or more signal characteristics such that the detector 142 rejects, ignores, or otherwise fails to detect electromagnetic radiation attributable to the emitter 160 of the second emitter-detector arrangement 106.

In one or more exemplary embodiments, the emitter 140 is mounted within or otherwise supported by the housing 101 of the tracking device 102 to emit the electromagnetic radiation through the aperture portion 103 of the housing 101 (e.g., at an angle relative to the y-reference direction) along the line of sight 105, with the detector 142 being mounted within or otherwise supported by the housing 101 of the tracking device 102 proximate the emitter 140 to align the sensing element(s) of the detector 142 with the line of sight 105 through the aperture portion 103 (e.g., at substantially the same angle relative to the y-reference direction as the emitter 140). In this regard, the tracking device 102 may include an optics arrangement 144 including one or more lenses, filters, and/or other optical elements associated with the emitter-detector arrangement 104 to direct the electromagnetic radiation from the emitter 140 along the line of sight 105 towards the plane of rotation of the blade 120. Additionally, the optics arrangement 144 may direct incident electromagnetic radiation emanating from the plane of rotation of the blade 120 (e.g., electromagnetic radiation reflected by the blade 120) towards the detector 142. For example, in one or more embodiments, the optics arrangement 144 may collimate the electromagnetic radiation emitted by the emitter 140 along the line of sight 105 while also focusing the detector 142 along the line of sight 105. Accordingly, the subject matter may be described herein in the context of the emitter 140 and detector 142 sharing a common line of sight 105. However, in alternative embodiments, the emitter 140 and detector 142 may have different lines of sight that intersect at a particular location that effectuates a common line of sight 105 between the tracking device 102 and the rotational plane of the blade(s) 120 (e.g., intersecting at the optics arrangement 144, at a target location in the rotational plane). Furthermore, although FIG. 1 depicts the paired emitter 140 and detector 142 being aligned with the line of sight 105, in alternative embodiments, the emitter 140 and detector 142 may be aligned in any particular direction with a corresponding optics arrangement 144 configured to effectuate the common line of sight 105. Additionally, although FIG. 1 depicts the optical arrangement 144 as a separate component within the tracking device 102, in alternative embodiments, the optical arrangement 144 may be integrated with or otherwise implemented as part of the emitter-detector arrangement 104.

In exemplary embodiments, the emitter 140 and the detector 142 are disposed proximate one another within the housing 101 of the tracking device 102. For example, the emitter 140 and the detector 142 may be adjacent to one another, or spaced apart from one another in a plane perpendicular to the common line of sight 105 by a negligible separation distance (e.g., a separation distance substantially equal to zero). In this regard, the emitter 140 and the detector 142 may be understood as being collocated with one another, in that they may be aligned substantially parallel to one another when directed towards a target location in the rotational plane of the blade(s) 120. In exemplary embodiments, the emitter 140 is realized as a laser, such as a semiconductor laser or laser diode, which is configured to emit electromagnetic radiation in a portion of the electromagnetic spectrum (e.g., the near-infrared portion, the visible light portion, or the like). In such embodiments, the detector 142 is realized as a laser detector, such as a photodiode, which detects or is otherwise sensitive to the electromagnetic radiation emitted by the laser 140 (e.g., the emitted portion of the electromagnetic spectrum). In this regard, the detector 142 may reject, ignore, or otherwise disregard electromagnetic radiation outside of the portion of the electromagnetic spectrum emitted by the laser 140.

Similar to the emitter-detector arrangement 104, the second emitter-detector arrangement 106 includes an emitter 160 configured to emit electromagnetic radiation along the second line of sight 107, a detector 162 configured to detect electromagnetic radiation along the second line of sight 107, and an optics arrangement 164 configured to direct, collimate, or otherwise focus electromagnetic radiation along the common line of sight 107 to/from the emitter-detector arrangement 106. As described in greater detail below, in some embodiments, the detector 162 may also be tuned or otherwise configured to selectively detect electromagnetic radiation having one or more signal characteristics corresponding to the electromagnetic radiation emitted by emitter 160, such that the detector 162 rejects, ignores, or otherwise fails to detect electromagnetic radiation attributable to the emitter 140 of the first emitter-detector arrangement 104. In this regard, the emitter 160 may be realized as a laser which is configured to emit electromagnetic radiation in a different portion of the visible portion of the electromagnetic spectrum than the emitter 140, with the detector 162 being realized as a laser detector which detects or is otherwise sensitive to that portion of the electromagnetic radiation without responding to the portion of the electromagnetic spectrum emitted by the emitter 140. For example, the first emitter-detector arrangement 104 may operate in the near-infrared portion of the electromagnetic spectrum while the second emitter-detector arrangement 106 operates in the visible portion of the electromagnetic spectrum.

In exemplary embodiments, the emitter 160 is mounted within or otherwise supported by the housing 101 of the tracking device 102 to emit the electromagnetic radiation through the aperture portion 103 of the housing 101 along the line of sight 107, and the detector 162 is mounted within or otherwise supported by the housing 101 of the tracking device 102 to detect electromagnetic radiation aligned with the line of sight 107 through the aperture portion 103. The optics arrangement 164 may collimate the electromagnetic radiation along the line of sight 107 to/from the emitter-detector arrangement 106, or otherwise facilitate a common line of sight 107 between the tracking device 102 and the rotational plane of the blade(s) 120 for the emitter-detector arrangement 106. As described above, in alternative embodiments, the emitter 160 and detector 162 may have different lines of sight that intersect at a particular location that effectuates the common line of sight 107, and/or the emitter 160 and detector 162 may be aligned in any particular direction for which the optics arrangement 164 is configured to effectuate the common line of sight 107.

As illustrated in FIG. 1, the line of sight 105 associated with the first emitter-detector arrangement 104 intersects the line of sight 107 associated with the second emitter-detector arrangement 106 at a point 113 between the tracking device 102 and the rotational plane of the blade(s) 120 to define a triangular (or conical) field of view 115 of the rotational plane that facilitates identifying when a particular blade 120 enters and exits the field of view 115. In this regard, the triangular field of view 115 facilitates determining the time difference between when the blade 120 intersects the first line of sight 105 and when the blade 120 intersects the second line of sight 107, which in turn, may be utilized to determine the track height (or relative distance from the tracking device 102 to the blade 120) based on the rotational speed of the blade 120 and the angle of intersection between the lines of sight 105, 107. For example, in one embodiment, the first line of sight 105 and/or the first emitter-detector arrangement 104 is angled with respect to the y-reference direction in a first rotational direction about the z-reference direction (e.g., 11° clockwise) with the second line of sight 107 and/or the first emitter-detector arrangement 106 being angled with respect to the y-reference direction by substantially the same angle in the opposite rotational direction about the z-reference direction (e.g., 11° counterclockwise).

As described in greater detail below in the context of FIG. 2, in response to a blade 120 traveling in the direction indicated by arrow 121 traversing or otherwise entering the line of sight 105 of the emitter-detector arrangement 104, the detector 142 senses, detects, or otherwise identifies the blade 120 interrupting the electromagnetic radiation emitted by the emitter 140. For example, in one or more embodiments, when at least a portion of the blade 120 is aligned with the line of sight 105, the blade 120 reflects or scatters at least a portion of the electromagnetic reflection emitted by the emitter 140 back towards the tracking device 102 along the line of sight 105. The reflected electromagnetic radiation having signal characteristics corresponding to the emission by the emitter 140 that is incident on the detector 142 via the aperture portion 103 and the optics arrangement 144 results in the sensing element(s) of the detector 142 generating corresponding electrical output signals indicative of at least a portion of the blade 120 being aligned with the line of sight 105. Similarly, when at least a portion of the blade 120 is aligned with the second line of sight 107, the blade 120 reflects or scatters at least a portion of the electromagnetic reflection emitted by the emitter 160 back towards the tracking device 102 along the line of sight 107. The reflected electromagnetic radiation incident on the detector 162 results in the sensing element(s) of the detector 162 generating corresponding electrical output signals indicative of at least a portion of the blade 120 being aligned with the line of sight 107.

Still referring to FIG. 1, the processing system 108 is coupled to the emitter-detector arrangements 104, 106 to control operation of the emitters 140, 160 and receive output signals from the detectors 142, 162 indicative of a blade 120 crossing the respective lines of sight 105, 107 defining the field of view of the tracking device 102. As described in greater detail below in the context of FIG. 2, in some embodiments, the processing system 108 may signal, instruct, or otherwise command the emitters 140, 160 to emit electromagnetic radiation having one or more unique signals characteristics relative to the other emitter 140, 160. For example, the processing system 108 may command the first emitter 140 to modulate a signal characteristic of its electromagnetic radiation (e.g., the amplitude, frequency, phase, polarization, or the like) while commanding the second emitter 160 to modulate the signal characteristic of its electromagnetic radiation in a different manner (e.g., by providing different values for the signal characteristic to the respective emitters 140, 160). In other embodiments, the processing system 108 may command the first emitter 140 to emit electromagnetic radiation with a wavelength that is different from the wavelength of the electromagnetic radiation emitted by the second emitter 160. Similarly, the processing system 108 may signal, instruct, or otherwise command the detectors 142, 162 to detect electromagnetic radiation having the unique signal characteristic(s) corresponding to the emission by its associated emitter 140, 160. In this regard, the processing system 108 may tune each emitter 140, 160 to emit electromagnetic radiation in a particular manner and tune its associated detector 142, 162 in a corresponding manner to detect that electromagnetic radiation.

Depending on the embodiment, the processing system 108 may be realized using any suitable processing device, hardware, logic circuitry, and/or combination thereof. For example, the processing system 108 may include one or more processors, central processing units (CPUs), controllers, microprocessors, microcontrollers, processing cores and/or other computing resources configured to support the subject matter described herein. In exemplary embodiments, the processing system 108 includes or is otherwise coupled to a data storage element (or memory), such as random access memory (RAM), read only memory (ROM), flash memory, magnetic or optical mass storage, or any other suitable configuration of non-transitory short or long term data storage or other non-transitory computer-readable media capable of storing programming instructions for execution. The stored programming instructions, when read and executed by the processing system 108, cause the processing system 108 to perform various tasks, functions, and/or processes to control operations of the tracking device 102 and support the blade tracking process 200 described in greater detail below in the context of FIG. 2.

In exemplary embodiments, the processing system 108 is coupled to the interface 111 of the tracking device 102 for coupling the processing system 108 to the monitoring system 112. In this regard, the interface 111 may be realized as one or more ports, plugs, receptacles, terminals, cables, or the like for providing an electrical interconnection between the processing system 108 and the monitoring system 112. As described in greater detail below in the context of FIG. 2, based on the output signals generated by the detector 142 in response to a blade 120 entering the first line of sight 105, the processing system 108 generates or otherwise provides an output signal (e.g., a square wave electrical pulse) at the interface 111 indicative of the blade 120 entering the field of view of the tracking device 102. Similarly, based on the output signals generated by the detector 162 in response to a blade 120 entering the second line of sight 107, the processing system 108 generates or otherwise provides another output signal at the interface 111 indicative of the blade 120 exiting the field of view of the tracking device 102. In this regard, the processing system 108 may include one or more pulse generators suitably coupled to the outputs of the detectors 142, 162.

The monitoring system 112 generally represents the combination of hardware, firmware and/or other components of the tracking system 100 that is coupled to the tracker interface 111 to receive the output signals indicative of a blade 120 traversing the field of view of the tracker 102 and calculate or otherwise determine a track height for the blade 120 relative to a reference plane of rotation for the blade(s) 120 associated with the rotor assembly 116. For example, based on the time difference between a first tracker output pulse indicative of the blade 120 traversing the first line of sight 105 and a second tracker output pulse indicative of the blade 120 traversing the second line of sight 107, the monitoring system 112 may determine a distance (or deviation) in the y-reference direction relative to xz-reference plane of rotation using the rotational speed of the blade 120 (e.g., obtained via a sensor system 114). In exemplary embodiments, the monitoring system 112 determines the track height fir each of the blades 120 associated with the rotor assembly 116.

In exemplary embodiments, the monitoring system 112 is also coupled to one or more sensor systems 114 onboard the rotorcraft 110, which are configured to sense, measure, or otherwise quantify one or more operating characteristics of the rotorcraft 110. For example, a sensor system 114 onboard the rotorcraft 110 may include one or more accelerometers, gyroscopes (or gyrometers), inclinometers, or the like configured to quantify the rate or frequency at which the rotorcraft 110 vibrates or otherwise oscillates during operation of the rotorcraft 110. In exemplary embodiments, based on the measurement data from the sensor system(s) 114 indicative of the vibrational characteristics of the rotorcraft 110, the monitoring system 112 modifies or otherwise adjusts the rotor assembly 116 in a manner that is influenced by the track heights for the blades 120 associated with the rotor assembly 116. For example, the monitoring system 112 may perform one or more rotor track and balance algorithms to determine a plurality of different combinations of different blade height adjustments that are likely to reduce vibration of the rotorcraft 110. Based on the blade track heights determined based on the outputs of the tracking device 102, the monitoring system 112 may identify or otherwise select the combination of blade height adjustments that reduces the cumulative deviations from the reference plane of rotation. Thereafter, the monitoring system 112 signals, commands, or otherwise instructs the rotor assembly 116 to adjust the tracks of the respective blades 120 in accordance with the selected combination of blade height adjustments. Additionally, in some embodiments, the monitoring system 112 may utilize the time difference between when a particular emitter-detector arrangement 104, 106 detects a first blade 120 and when that emitter-detector arrangement 104, 106 detects a subsequent blade 120 to determine the angular difference (or phase) between pairs of successive blades 120 and adjust the respective blades 120 accordingly.

Figure 2:
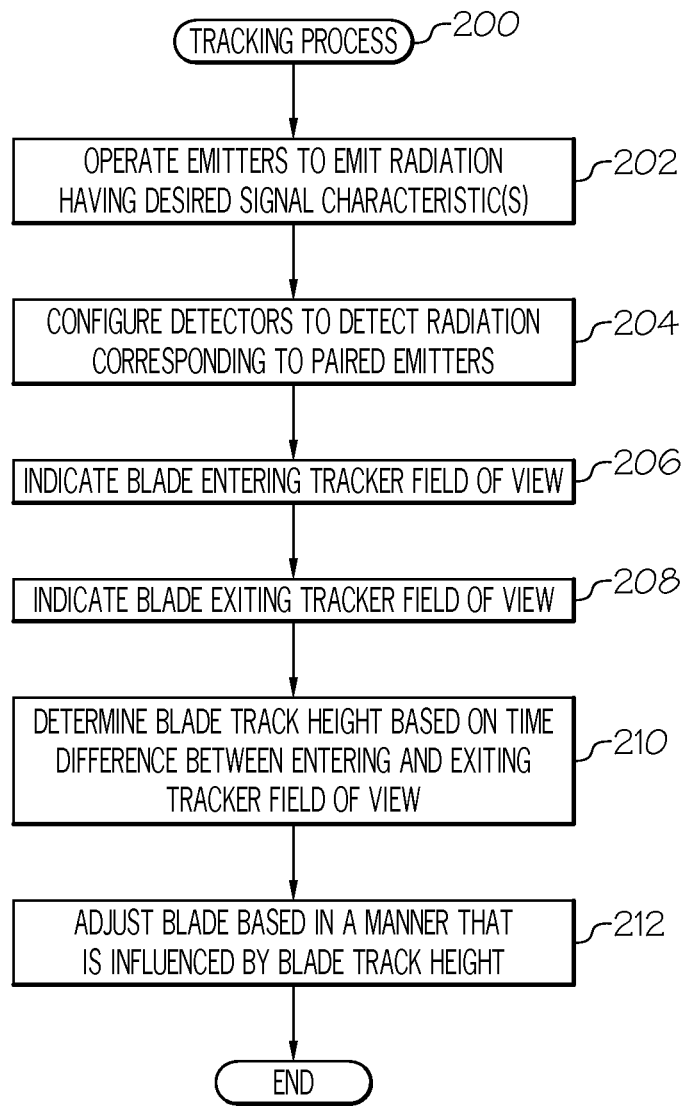
FIG. 2 is a flow diagram of an exemplary tracking process suitable for use with the tracking system of FIG. 1 in accordance with one or more embodiments.

FIG. 2 depicts an exemplary embodiment of a tracking process 200 for tracking movement of an object, such as one or more blades 120 associated with a rotorcraft 110 in the tracking system 100 of FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the tracking process 200 may be performed by different elements of the tracking system 100, such as, for example, the tracking device 102, the emitter-detector arrangements 104, 106, the processing system 108, and/or the monitoring system 112. It should be appreciated that the tracking process 200 may include any number of additional or alternative tasks, the tasks need not be performed in the illustrated order and/or the tasks may be performed concurrently, and/or the tracking process 200 may be incorporated into a more comprehensive procedure or process having additional functionality not described in detail herein. Moreover, one or more of the tasks shown and described in the context of FIG. 2 could be omitted from a practical embodiment of the tracking process 200 as long as the intended overall functionality remains intact.

Referring to FIGS. 1-2, in exemplary embodiments, the tracking process 200 is performed after the tracking device 102 is mounted to the rotorcraft 110 as part of a rotor track and balance procedure implemented or otherwise supported by the monitoring system 112. In this regard, the monitoring system 112 may provide one or more signals to the tracking device 102 and/or the processing system 108 at the interface 111 indicative of a desire to initiate the tracking process 200 at appropriate times during the rotor track and balance procedure. For example, after determining that the rotorcraft 110 is performing a particular maneuver or otherwise operating in a desired manner (e.g., hovering), the monitoring system 112 may signal the processing system 108 to initiate the tracking process 200 while the rotorcraft 110 is operated in that desired manner.

The illustrated tracking process 200 begins by operating the emitters of the tracking device to emit electromagnetic radiation and configuring the detectors paired with those emitters to detect the electromagnetic radiation emitted by its associated emitter (tasks 202, 204). In this regard, the processing system 108 signals, commands, or otherwise instructs the emitter 140 to emit electromagnetic radiation and signals, commands, or otherwise instructs the detector 142 to concurrently detect electromagnetic emitted by the emitter 140. For example, the processing system 108 may tune or otherwise adjust the emitter 140 to emit electromagnetic radiation with one or more unique signal characteristics, and tune or otherwise adjust the detector 142 to recognize or otherwise detect incident electromagnetic radiation having the unique signal characteristic(s). In a similar manner, the processing system 108 signals the emitter 160 to emit electromagnetic radiation and signals the detector 162 to concurrently detect electromagnetic emitted by the emitter 160. For example, the processing system 108 may tune or otherwise adjust the second emitter 160 to emit electromagnetic radiation with values for one or more signal characteristics that are different than those of the electromagnetic radiation emitted by the first emitter 140, and tune or otherwise adjust the second detector 162 to recognize or otherwise detect incident electromagnetic radiation having those signal characteristic value(s) associated with the electromagnetic radiation emitted by the second emitter 160. In this regard, the first detector 142 may be tuned so that it filters, ignores, or otherwise fails to detect electromagnetic radiation emitted by the second emitter 160, with the second detector 162 being tuned so that it fitters, ignores, or otherwise fails to detect electromagnetic radiation emitted by first emitter 140. That said, it will be appreciated that in some embodiments, the electromagnetic radiation emitted by the first emitter 140 may have substantially the same signal characteristics as the electromagnetic radiation emitted by the second emitter 160. However, using unique signal characteristics for each of the emitter-detector pairs 104, 106 reduces the likelihood of interference by the other emitter 140, 160 and/or external radiation sources.

In exemplary embodiments, the tracking process 200 continues by indicating when the object being tracked enters the field of view defined by the emitter-detector pairs, and thereafter, indicating when the object being tracked exits the field of view defined by the emitter-detector pairs (tasks 206, 208). For example, for a blade 120 rotating in the direction indicated by arrow 121, the processing system 108 generates or otherwise provides, at the interface 111, an output signal indicative of the blade 120 traversing the line of sight 105 and entering the tracker field of view 115 in response to the detector 142 detecting electromagnetic radiation with signal characteristics corresponding to the emission by the emitter 140 that is reflected back towards the tracker 102 by the blade 120. Thereafter, the processing system 108 generates or otherwise provides, at the interface 111, a second output signal indicative of the blade 120 traversing the line of sight 107 and exiting the tracker field of view 115 in response to the detector 162 detecting electromagnetic radiation with signal characteristics corresponding to the emission by the emitter 160 that is reflected back towards the tracker 102 by the blade 120. It should be noted that, in practice, the processing system 108 may generate output signals indicating entry and exit of the field of view for each of the blades 120 associated with the rotor assembly 116 as each individual blade 120 traverses the field of view. In this regard, the monitoring system 112 correlates or otherwise associates the output signals at the interface 111 with the appropriate blade 120 of the rotor assembly 116 (e.g., based on one or more signals from the rotor assembly 116 indicating the current orientation of the blades 120 relative to the rotorcraft 110).

In the illustrated tracking process 200 continues by calculating or otherwise determining for each respective blade, its track height relative to a reference rotational plane based on a time difference between the output signal(s) corresponding to that blade entering the tracker field of view 115 and the output signal(s) corresponding to that blade exiting the tracker field of view 115 (task 210). For example, based on the rotational speed of the rotor assembly 116 and the current configuration of the rotor assembly 116, the monitoring system 112 may calculate or otherwise determine a reference time difference indicative of a blade 120 traveling in the xz-reference plane of rotation. Thereafter, the monitoring system 112 receives or otherwise obtains, for each blade 120 rotating in direction 121, the output signal(s) corresponding to the blade 120 traversing the first line of sight 105 and the output signal(s) corresponding to the blade 120 traversing the second line of sight 107. Based on the time difference between those signals relative to the reference time difference indicative rotation in the xz-reference plane, the monitoring system 112 may calculate or otherwise determine a deviation in the y-direction for a respective blade 120. In this regard, when the time difference between the field of view entry and exit signals associated with a blade 120 is less than the reference time difference, the monitoring system 112 determines a blade track height corresponding to a deviation from the xz-reference plane in the negative y-direction. Conversely, when the time difference between the field of view entry and exit signals associated with a blade 120 is greater than the reference time difference, the monitoring system 112 determines a blade track height corresponding to a deviation from the xz-reference plane in the positive y-direction.

In the illustrated embodiment, the tracking process 200 continues by adjusting one or more of the blades in a manner that is influenced by the track height(s) of the blade(s) (task 212). In this regard, the monitoring system 112 utilizes one or more rotor track and balance algorithms to identify various rotor assembly 116 and/or blade configurations likely to achieve a desired operation of the rotorcraft 110 based on the measurement data from the onboard sensor system(s) 114. Thereafter, the monitoring system 112 selects or otherwise identifies the rotor assembly 116 and/or blade configuration that involves a combination of blade adjustments that best compensates for the current blade track height(s) and minimizes the cumulative deviation of the blade track height(s) relative to the xz-reference plane. In this manner, the monitoring system 112 adjusts the tracks of the blades 120 via the rotor assembly 116 in a manner that is likely to achieve a desired operation of the rotorcraft 110 while also reducing blade track height imbalances in the y-direction relative to the xz-reference plane of rotation.

To briefly summarize, the subject matter described herein allows for blade track heights to be determined in a variety of environmental conditions by using an active tracking device that includes a plurality of paired emitters and detectors. In this regard, the active tracking device having detectors that focus on the specific electromagnetic radiation emitted by their paired detectors may operate substantially independent of the ambient lighting or the contrast between the helicopter blades and the background. For example, the ability of the detectors to detect electromagnetic radiation emitted by their paired emitters is effectively independent of the color of the helicopter blades and/or the color of the background sky. Thus, rotor track and balance algorithms may be reliably performed, and performed at any time of day (day or night, allowing seamless transition when rotor track and balance is performed at sunrise or sunset), which, in turn reduces the amount of time for which a rotorcraft may be grounded. Additionally, the active tracking device does not require more manually intensive tasks, such as, for example, placing reflective and/or colored material on the blades, installing reflective tape or tip reflectors on the blades, and the like.

For the sake of brevity, conventional techniques related to blade tracking, rotor track and balance, health and usage monitoring, lasers, optics, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, took-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A tracking device comprising:
   a first emitter-detector arrangement having a first line of sight associated therewith, the first emitter-detector arrangement comprising:
      a first emitter to emit first radiation along the first line of sight towards a reference plane of motion for an object;
      a first detector proximate the first emitter to detect at least a first portion of the first radiation reflected from the reference plane along the first line of sight;
   a second emitter-detector arrangement having a second line of sight associated therewith, the first line of sight and the second line of sight being different, the second emitter-detector arrangement comprising:
      a second emitter to emit second radiation along the second line of sight towards the reference plane; and
      a second detector proximate the second emitter to detect at least a second portion of the second radiation reflected from the reference plane along the second line of sight.

2. The tracking device of claim 1, further comprising a housing having the first emitter, the first detector, the second emitter, and the second detector contained therein, wherein the housing includes an aperture portion aligned with the first line of sight and the second line of sight.

3. The tracking device of claim 1, wherein the first line of sight and the second line of sight intersect between the tracking device and the reference plane.

4. The tracking device of claim 3, wherein:
the first detector detects the first radiation in response to the object traversing the first line of sight; and
the second detector detects the second radiation in response to the object traversing the second line of sight.

5. The tracking device of claim 1, wherein:
the first detector is substantially aligned with the first line of sight; and
the second detector is substantially aligned with the second line of sight.

6. The tracking device of claim 5, wherein the first detector is collocated with the first emitter and the second detector is collocated with the second emitter.

7. The tracking device of claim 1, wherein:
the first detector has a third line of sight intersecting the first line of sight in the reference plane, the first detector detecting the first radiation in response to the object traversing the first line of sight; and
the second detector has a fourth line of sight intersecting the second line of sight in the reference plane, the second detector detecting the second radiation in response to the object traversing the second line of sight.

8. The tracking device of claim 1, further comprising:
a first optics arrangement aligned with the first line of sight; and
a second optics arrangement aligned with the second line of sight, wherein:
the first detector detects the first radiation via the first optics arrangement; and
the second detector detects the second radiation via the second optics arrangement.

9. The tracking device of claim 1, further comprising:
an output interface; and
a processing system coupled to the first detector, the second detector and the output interface to generate a first output signal at the output interface in response to the first detector detecting the first radiation and generate a second output signal at the output interface in response to the second detector detecting the second radiation.

10. The tracking device of claim 1, wherein:
the first radiation has a first value for a signal characteristic;
the second radiation has a second value for the signal characteristic; and
the first value is different from the second value.

11. The tracking device of claim 10, further comprising a processing system coupled to the first detector and the second detector to tune the first emitter for the first value for the signal characteristic and tune the second emitter for the second value for the signal characteristic.

12. The tracking device of claim 11, wherein the processing system is coupled to the first detector and the second detector to tune the first detector to detect the first value for the signal characteristic and tune the second detector to detect the second value for the signal characteristic.

13. The tracking device of claim 1, wherein:
the first emitter comprises a first laser;
the first detector comprises a first laser detector;
the second emitter comprises a second laser; and
the second detector comprises a second laser detector.

14. A blade tracking device comprising:
a first emitter-detector arrangement having a first line of sight associated therewith to emit first radiation having a first value for a signal characteristic along the first line of sight and detect at least a first portion of the first radiation reflected along the first line of sight in response to a blade traversing the first line of sight;
a second emitter-detector arrangement having a second line of sight associated therewith to emit second radiation having a different value for the signal characteristic along the second line of sight and detect at least a second portion of the second radiation reflected along the second line of sight in response to the blade traversing the second line of sight, wherein the second line of sight is different from the first line of sight; and
a processing system coupled to the first emitter-detector arrangement and the second emitter-detector arrangement to:
generate a first output signal at an interface of the blade tracking device in response to the first emitter-detector arrangement detecting the first radiation; and
generate a second output signal at the interface in response to the second emitter-detector arrangement detecting the second radiation.

15. The blade tracking device of claim 14, wherein:
the first emitter-detector arrangement comprises:
a first laser to emit the first radiation; and
a first detector proximate the first laser to detect the first radiation reflected along the first line of sight by the blade; and
the second emitter-detector arrangement comprises:
a second laser to emit the second radiation; and
a second detector proximate the second laser to detect the second radiation reflected along the second line of sight by the blade.

16. The blade tracking device of claim 14, further comprising a housing having an aperture portion, wherein the first emitter-detector arrangement is mounted within the housing to align the first line of sight with the aperture portion and second emitter-detector arrangement is mounted within the housing to align the second line of sight with the aperture portion.

17. The blade tracking device of claim 16, wherein the first line of sight and the second line of sight are configured to intersect between the aperture portion and the blade.

18. The blade tracking device of claim 14, wherein the processing system configures the first emitter-detector arrangement to emit and detect the first radiation having the first value for a signal characteristic and configures the second emitter-detector arrangement to emit and detect the second radiation having the different value for the signal characteristic.

19. A method of monitoring rotation of a blade, the method comprising:
emitting, by a first emitter, first radiation with a first value for a signal characteristic along a first line of sight towards a reference plane of rotation for the blade;
generating a first output indication in response to a first detector paired with the first emitter detecting at least a first portion of the first radiation reflected along the first line of sight by the blade;
generating, by a second emitter, second radiation with a different value for the signal characteristic along a second line of sight towards the reference plane of rotation for the blade, wherein the second line of sight is different from the first line of sight; and generating a second output indication in response to a second detector paired with the second emitter detecting at least a second portion of the second radiation reflected along the second line of sight by the blade.

20. The method of claim 19, further comprising:

configuring the first emitter to emit the first radiation with the first value for the signal characteristic, the first emitter emitting the first radiation along the first line of sight towards the reference plane of rotation for the blade;

configuring the first detector paired with the first emitter to detect the first radiation having the first value for the signal characteristic;

configuring the second emitter to emit the second radiation with the different value for the signal characteristic, the second emitter emitting the second radiation along the second line of sight towards the reference plane of rotation for the blade; and configuring the second detector paired with the second emitter to detect the second radiation having the different value for the signal characteristic, wherein:

generating the first output indication comprises generating a first output pulse in response to the first detector detecting the first radiation reflected along the first line of sight by the blade; and generating the second output indication comprises generating a second output pulse in response to the second detector detecting the second radiation reflected along the second line of sight by the blade.

* * * * *